United States Patent [19]
Curbillon et al.

[11] Patent Number: 5,853,260
[45] Date of Patent: *Dec. 29, 1998

[54] ROTATION CENTER TYPE JOINT AND ASSEMBLIES USING IT

[75] Inventors: Laurent Curbillon, Cannes la Bocca; Jean-Marc Pellissier, Mandelieu, both of France

[73] Assignee: Societe Nationale Industrielle et Aerospatiale, Paris, France

[ * ] Notice: This patent issued on a continued prosecution application filed under 37 CFR 1.53(d), and is subject to the twenty year patent term provisions of 35 U.S.C. 154(a)(2).

[21] Appl. No.: 713,280

[22] Filed: Sep. 12, 1996

[30] Foreign Application Priority Data

Sep. 12, 1995 [FR] France ..................... 95 10650

[51] Int. Cl.$^6$ .................................. G02B 5/132
[52] U.S. Cl. .................... 403/291; 384/192; 384/215
[58] Field of Search ................. 384/192, 215, 384/535, 581; 248/604, 603; 403/291, 2

[56] References Cited

U.S. PATENT DOCUMENTS

| | | | |
|---|---|---|---|
| 2,936,141 | 5/1960 | Rapata | 248/604 |
| 3,604,765 | 9/1971 | Babcock | 384/192 |
| 4,655,614 | 4/1987 | Schott | 384/215 X |

FOREIGN PATENT DOCUMENTS

| | | | |
|---|---|---|---|
| 206686 | 12/1986 | European Pat. Off. | 384/192 |
| 986550 | 8/1951 | France | 384/535 |
| 1225188 | 6/1960 | France | 384/215 |
| 2 703 415 | 10/1994 | France . | |
| 50022 | 9/1921 | Sweden | 384/535 |

*Primary Examiner*—Anthony Knight
*Attorney, Agent, or Firm*—Fisher, Christen & Sabol

[57] ABSTRACT

A rotation center type joint has a one-piece body with an inner part, an outer part and a plurality of elastically deformable transverse arms inclined relative to the axis of the body, linking the inner and outer parts and converging towards the rotation center.

8 Claims, 2 Drawing Sheets

ROTATION CENTER TYPE JOINT AND ASSEMBLIES USING IT

BACKGROUND OF THE INVENTION

1. Field of the Invention

The present invention concerns a rotation center type joint.

2. Description of the Prior Art

Assembling parts, mechanisms or mechanical devices may require the use of a rotation center type joint.

Rotation center type joints are spherical or ball-and-socket type joints and principally comprise an inner ring and an outer ring cooperating with each other through a spherical bearing surface defined by the convex lateral surface of the inner ring and the concave lateral surface of the outer ring. When the joint is mounted between two members to be assembled, for example, the rings each cooperate with one member and can move relative to each other, to a limited extent, by pivoting about the rotation center of the spherical bearing surface.

Although this type of spherical or ball-and-socket joint is widely, indeed almost universally, used, its design nevertheless has certain inherent drawbacks.

For the joint to function play is required between the concave and the convex surfaces of the ring, so that they can move freely relative to each other, although this play is certainly minimal. Also, if a joint of this kind with play is subject to limited angular relative movement (with relative displacement between the inner and outer rings) and to alternating radial and/or axial loads at high frequencies, there is premature wear of the lubrication provided in the joint and/or of the coating of the functional surfaces of the rings.

This tribological deterioration of the joint, which may be accentuated if the joint is exposed to wide variations in temperature (for example, in aerospace applications), increases the resisting torque between the concave and convex surfaces of the rings to the point where binding occurs or even to the point where the joint seizes up.

The untimely or irreversible immobilization of the joint due to wear at the points of contact can compromise the reliability of the mechanism or of the device in which the joint is mounted and cause dysfunctions thereof that may be hazardous.

An aim of the present invention is to remedy these drawbacks and the present invention concerns a rotation center type joint the design of which guarantees totally reliable operation in use, independently of the forces acting on the joint and of the ambient medium in which the joint is used.

SUMMARY OF THE INVENTION

To this end, the present invention consists in a rotation center type joint comprising a one-piece body having an axis and comprising an inner part, an outer part and a plurality of elastically deformable transverse arms inclined relative to said axis and linking said inner and outer parts and converging towards said rotation center, wherein said transverse arms are elastically deformable beams the neutral fibers of which converge towards said rotation center located on said axis.

Accordingly, the rotation center type joint of the invention has no functional play since it is defined by a single one-piece body, the linking arms serving as elastically deformable beams allowing relative angular movement of the members, to which the inner and outer parts are respectively fixed, about the rotation center which is on the longitudinal axis of said body. Consequently, the one-piece body joint of the invention is free of the previously mentioned problems inherent to wear at the points of contact between the surfaces of the rings and to relative displacement between the latter, since in accordance with the invention only the linking arms of the one-piece body are deformed.

This design of the joint additionally facilitates its manufacture and fitting it.

For example, said inner and outer parts are cylindrical and concentric with a common axis and the neutral fibers of said arms converge towards said rotation center located on said axis.

To enable free deformation of the arms due to axial as well as radial forces and to tilting moments, said elastically deformable linking arms are inclined relative to said parts of the body. Each linking arm is preferably at an angle of approximately 60° to the axis of said body.

Said elastically deformable linking arms are advantageously equi-angularly distributed around said parts and their cross-section is polygonal, for example square or rectangular.

Additionally, said joint body is made from a single material, i.e. it is monolithic.

Typical, but by no means exclusive, applications of a joint of this kind are in the aerospace field, in which mechanisms and systems may be temporarily or permanently subjected to high loads and vibrations that generate angular microdisplacements and to high variations in temperature.

In the case of a ball or roller bearing between a shaft and a hub, for example, associated with a particular instrument, a rotation center type joint of the kind previously defined may be provided either between said bearing and said hub or between said bearing and said shaft.

In the case of mounting a satellite reflector or the like on a pyrotechnic release or other type of mechanical linking device, a joint of this kind may be provided between said device (via its inner part) and said reflector (via its outer part).

The figures of the accompanying drawings show clearly how the invention may be put into effect. Similar items in the figures are identified by the same reference numbers.

DETAILED DESCRIPTION OF THE PREFERRED EMBODIMENT

Figure 1:
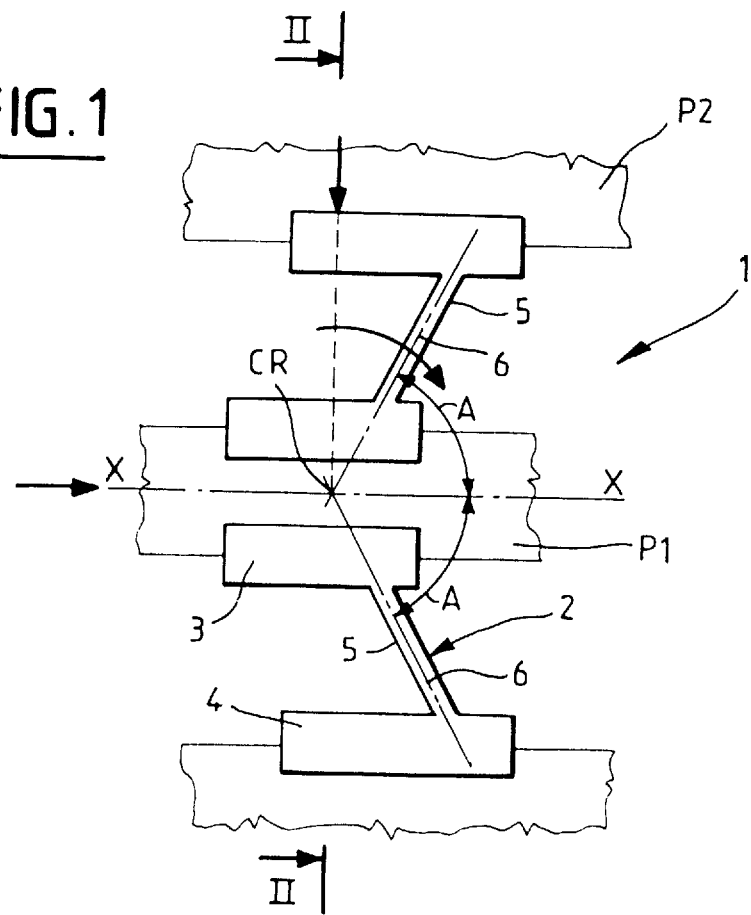
FIG. 1 shows in longitudinal section a typical embodiment of said joint of the invention.
Figure 2:
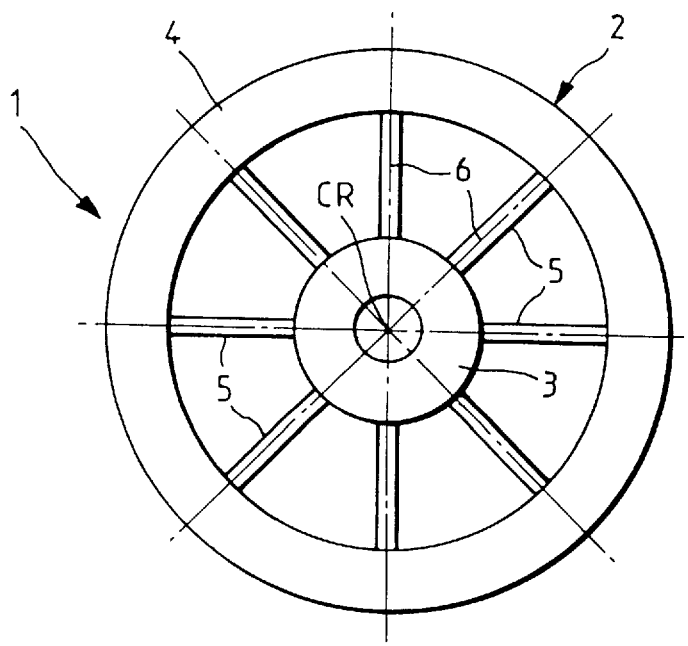
FIG. 2 is a view of said joint in cross-section on the line II—II in FIG. 1.

The joint 1 with rotation center CR shown in FIGS. 1 and 2 comprises a one-piece body 2 that has three parts, namely an inner part 3, an outer part 4 and linking arms 5 that transversely link the inner part 3 and the outer part 4.

These two parts are each cylindrical in shape with a ring-like annular cross-section and are concentric with each other about a common axis X—X. The joint 1 may be provided between a first member P1 such as a shaft, the axis of which is coincident with the axis X—X, and a second member P2 such as a hub, for example, and to this end the cylindrical inner part 3 is fixedly mounted on the member P1 while the cylindrical outer part 4 is fixedly mounted in the member P2. Both cylindrical parts 3 and 4 are rigid and they are linked by a plurality of identical linking arms 5 that are elastically deformable and that converge towards a common point corresponding to the rotation center CR of the joint. This center CR is on the axis X—X of the body 2, as shown in FIG. 1, substantially mid-way along the length of said cylindrical inner part 3.

The elastically deformable linking arms 5 are inclined to the axis X—X of the body, for example at an angle A of 60° to that axis. The angle A could obviously be different, depending on the forces and tilting moments to be supported and the required stiffness. The linking arms 5 are equi-angularly distributed about the axis X—X, as shown in FIG. 2. In this example there are eight arms, but the number could be different depending on requirements. The cross-section of the arms 5 can be polygonal, for example square or rectangular.

The linking arms 5 constitute elastic beams that can deform elastically due to the action of radial and axial forces and tilting moments (symbolically represented by arrows in FIG. 1) exerted on said joint, to allow relative angular movement of the members respectively attached to the rigid outer and inner parts about the rotation center CR towards which the neutral fibers 6 of said arms converge.

The dimensions of the joint 1 obviously depend on its application and allow for the loads to be transmitted, the required stiffness and the required degree of relative angular movement. On this basis, the material of the joint and therefore its mechanical characteristics and the length, cross-section and number and inclination angle of the linking arms can be accurately defined.

Figure 3:
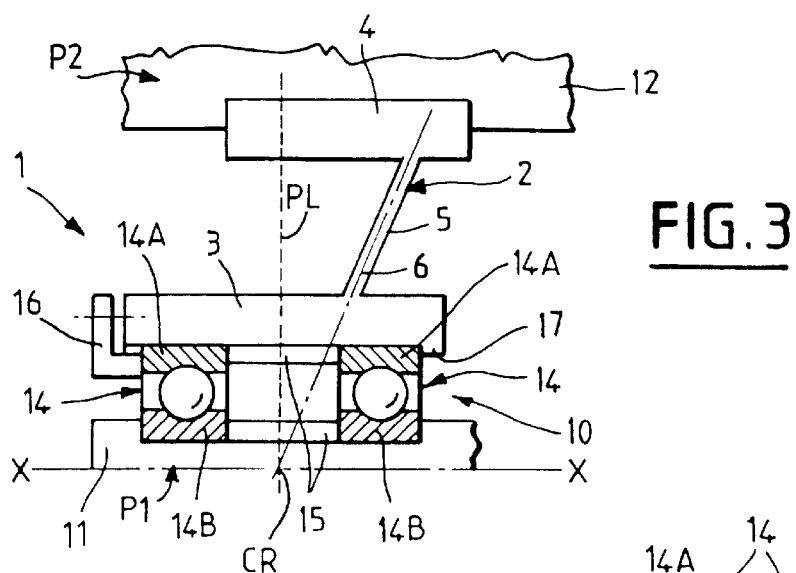
FIGS. 3, 4 and 5 show particular applications of said joint.
Figure 4:
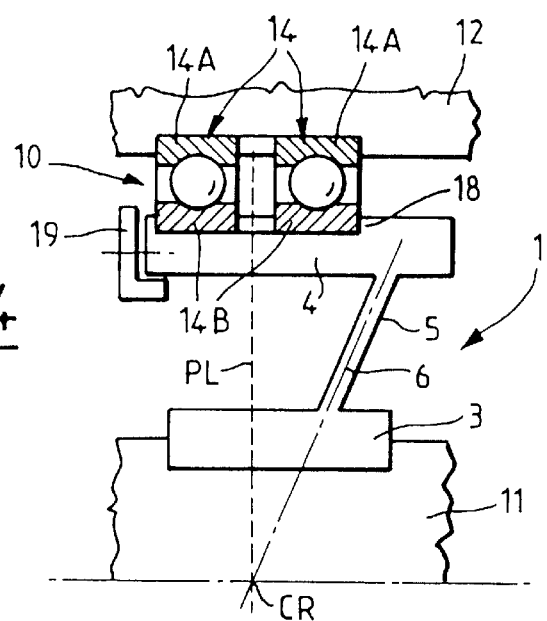

A first application of the joint 1 of the invention is shown in FIGS. 3 and 4 and this example concerns its mounting on ball bearings.

The bearings of mechanisms associated with scientific instruments on artificial satellites must satisfy requirements including:

absence of play in the bearing, in particular if great stability of the rotation axis is required;

mounting of the bearing on a rotation center type joint to guarantee that the mobile assembly is highly isostatic;

bearing reliability; and resistance to radial and/or axial loads and to "micro-oscillations" at high frequencies (up to 2000 Hz) during the launch phase.

The use of a conventional ball-and-socket joint with play can compromise the mission because of the occurrence of binding, as previously explained. Fitting a joint 1 of the invention avoids the previously described drawbacks and satisfies the stated requirements by providing a rotation center type ball or roller bearing that has no play and is reliable.

In the bearing 10 assembly shown in FIG. 3, the shaft 11 corresponds to the member P1 and the hub 12 corresponds to the member P2. Two small ball bearings 14 are provided in this case. The inner part 3 of the joint 1 is in contact with the outer rings 14A of the bearings and its outer part 4 is fixed to the hub 12. The inner rings 14B of the bearings are mounted on the rotating shaft 11. Spacers 15 are provided between the bearings and a member 16 may be attached to one side of the inner part 3 of the body 2 to constitute an axial abutment for the outer rings of the bearings. A shoulder 17 can be integrated with the other side of the inner part 3 to provide another axial abutment.

In the bearing 10 assembly shown in FIG. 4, in which the shaft and the hub respectively correspond to the members P1 and P2, the joint 1 is between the shaft 11 and the inner rings 14B of ball bearings 14 that have large dimensions in this case. A shoulder 18 is formed directly on the outer part 4 of the body, carrying the bearings. A member 19 is attached to the other side of this part to immobilize the inner rings 14B of said bearings in the axial direction.

Note that in both cases the neutral fibers 6 of the linking arms 5 converge towards the rotation center CR on the axis X—X and contained in a transverse plane PL passing substantially through the middle of said bearings, which helps to optimize the joint.

Figure 5:
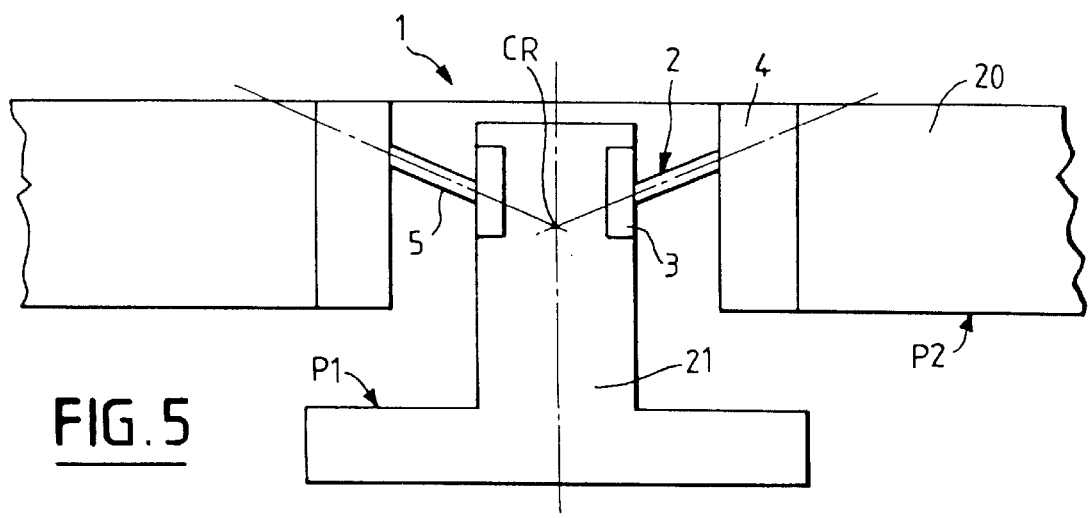

A second application of the joint 1 of the invention is shown diagramatically in FIG. 5.

The deployable reflectors of satellites are fixed and held in a position folded against the structure of the satellite during the launch phase by means of mechanical linking devices with pyrotechnic or other release means. To reduce the local loads on the reflector generated by the vibrational environment (launch phase) and the thermal environment (before deployment), the reflector is mounted on each device through a rotation center type joint.

The use of a one-piece joint 1 of the invention avoids the problems previously mentioned with using a conventional ball-and-socket joint with play.

To this end the outer part 4 of the one-piece body 2 is associated with the reflector 20 (corresponding to the member P2) and the inner part 3 is fixed to the pyrotechnic mechanical part 21 (corresponding to the member P1). The rotation center CR towards which the elastically deformable linking arms 5 converge is on the shaft of said device 21.

A one-piece body joint in practice allows angular relative movement of plus or minus one degree and supports radial and/or axial loads and tilting moments that alternate at high frequencies, said linking arms that constitute structural flexibilities deforming elastically whereas the rigid outer and inner parts of the one-piece body remain fixed and attached to their respective members.

There is claimed:

1. In combination, a satellite reflector on a mechanical linking device with release means with a rotation center type joint disposed between said mechanical linking device and said reflector, said rotation center type joint having a fixed rotation center and comprising a one-piece body having an axis and comprising an inner part, an outer part and a plurality of elastically deformable transverse arms inclined relative to said axis and linking said inner part and said outer part and converging towards said fixed rotation center, said transverse arms being elastically deformable beams, the ends of which are rigidly connected to said inner part and said outer part respectively and the neutral fibers of said elastically deformable beams converging towards said fixed rotation center located on said axis, said inner part and said outer part being respectively fixed to said mechanical linking device and to said reflector.

2. The combination as claimed in claim 1 wherein the cross-section of each of said transverse arms is polygonal.

3. The combination as claimed in claim 1 wherein each of said linking transverse arms is at an angle of substantially 60° to the axis of said one-piece body.

4. The combination as claimed in claim 1 wherein the required stiffnesses and flexibilities of said joint are obtained by adjustment of the following parameters:

the number and distribution of said transverse arms, the angle of said transverse arms relative to said axis, the cross-section and the length of said arms, and the material from which said one-piece body is constructed.

5. The combination as claimed in claim 1 wherein said elastically deformable linking arms are equi-angularly distributed around said inner and outer parts.

6. The combination as claimed in claim 1 includes a ball or roller bearing between a shaft and a hub, and said rotation center type joint is located either between said bearing and said hub or between said bearing and said shaft.

7. The combination as claimed in claim 6 wherein a plane transverse to said axis and passing through said rotation center joint passes substantially through the middle of said bearing.

8. The combination as claimed in claim 1 wherein only said transverse of said one-piece body are deformed.

* * * * *